G. W. BERRY.
AIRCRAFT INCLINOMETER.
APPLICATION FILED SEPT. 21, 1917.
1,312,303. Patented Aug. 5, 1919.
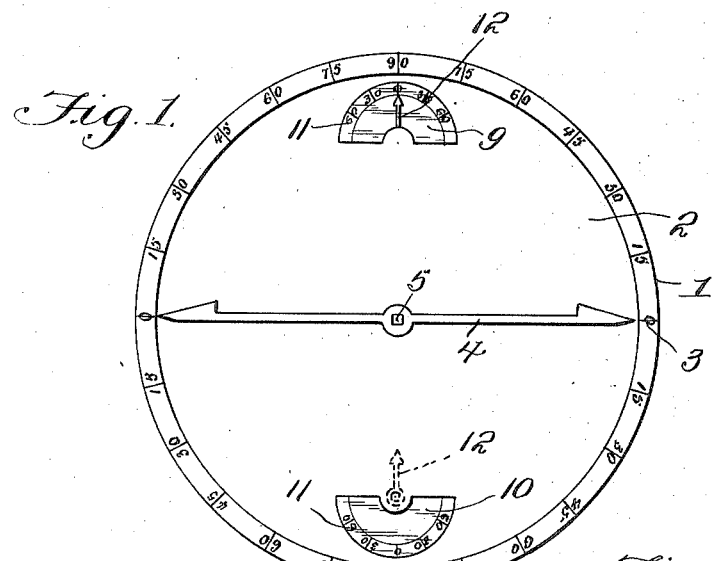
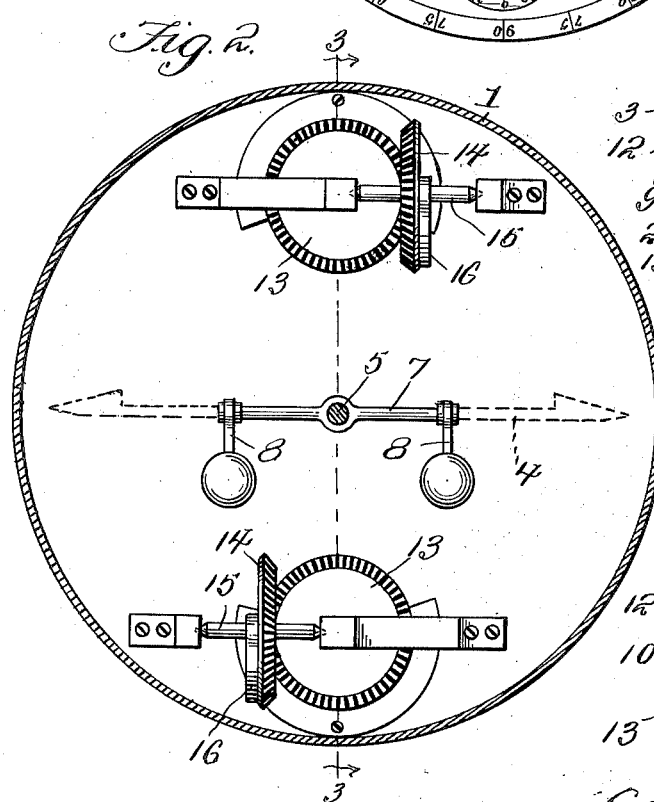
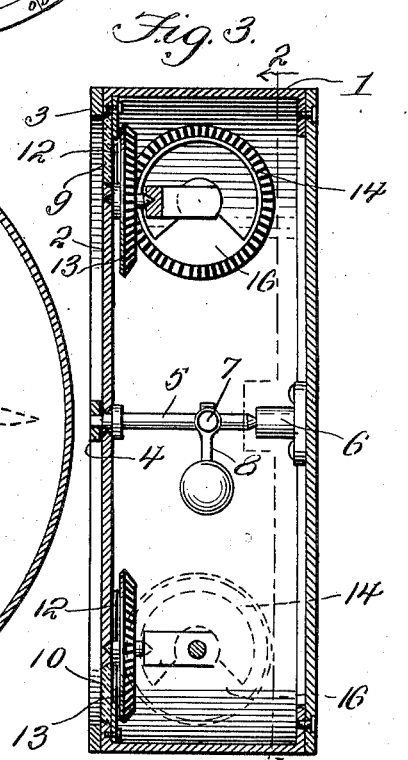
Witness
J. K. Wright
P. M. Smith
Inventor
George W. Berry
By Victor J. Evans
Attorney

UNITED STATES PATENT OFFICE.

GEORGE W. BERRY, OF BROOKLYN, NEW YORK.

AIRCRAFT-INCLINOMETER.

1,312,303.  Specification of Letters Patent.  Patented Aug. 5, 1919.

Application filed September 21, 1917. Serial No. 192,526.

*To all whom it may concern:*

Be it known that I, GEORGE W. BERRY, a citizen of the United States, residing at Brooklyn, in the county of Kings and State of New York, have invented new and useful Improvements in Aircraft-Inclinometers, of which the following is a specification.

This invention relates to inclinometers and is especially designed for use in conjunction with and upon aircraft for the purpose of enabling the aviator to ascertain at a glance the angle of ascent or descent and also the degree of lateral inclination or list of the machine.

It is well understood that there is a critical angle of ascent of an airplane, beyond which the power of the engine is insufficient to propel the machine at an economical speed to obtain the desired altitude in a minimum period of time. The inclinometer hereinafter described enables the aviator to accurately maintain the angle of ascent at the proper point.

Likewise in making turns to the right or left, a certain angle of inclination or bank of the machine is important to prevent what is known as side slipping and to enable a turn to be made in the shortest time and with the greatest safety. The inclinometer hereinafter described also provides for this.

With the above and other objects in view, the invention consists in the novel construction, combination and arrangement of parts, herein described, illustrated and claimed.

In the accompanying drawing:—

Figure 1 is a face view of the improved inclinometer.

Fig. 2 is a vertical diametrical section through the same on the line 2—2 of Fig. 3.

Fig. 3 is a horizontal section thereof on the line 3—3 of Fig. 2.

Referring to the drawings 1 designates the casing of the inclinometer, said casing in the preferred embodiment of the invention being cylindrical and one face 2 thereof being graduated in degrees to show the angle of inclination of the machine both laterally and longitudinally. The face 2 is in the form of a dial and the graduations 3 thereof extending around the peripheral portion of the dial are employed to indicate the lateral angle of inclination of the machine in both directions. In conjunction with the graduations 3, a double pointed indicator or hand 4 is employed. The indicator 4 is mounted fixedly upon a central arbor 5 which extends through the casing 1 and has its inner end journaled in a step or bearing 6 secured to the rear wall of the casing. Between its ends and within the casing 1, the arbor 5 has fixedly secured thereto a cross arm 7. Journaled on the opposite extremities of said cross arm are pendant weighted arms 8 which serve to sustain the pointer or indicator 4 in a horizontal position with respect to the earth's surface, irrespective of partial turning or rotative movement of the casing 1, it being understood that said casing is fixedly secured to the frame or body of an airplane. By swiveling or pivotally mounting the weighted arms 8 on the cross arm 9, the fore and aft inclination of the aircraft will not affect the operation of the indicating mechanism as thus far described.

The face plate or dial 2 is formed preferably in the top and bottom portions thereof with glazed semi-circular observation openings 9 and 10, reversely disposed in relation to each other and each graduated as indicated at 11 in degrees. In conjunction with each of the openings 9 and 10, I employ a pointer or indicator 12 having a fixed relation to a bevel gear 13. The gear 13 meshes with another bevel gear 14 on an arbor 15 at a right angle to the axis of the gear 13. The gear 14 in each case is provided with a weighted portion 16 so that it acts in the nature of a pendulum. When the aircraft is maintaining a perfectly horizontal flight, the pointers 12 extend vertically upward or when the machine is inclined in a fore and aft direction as when ascending and descending, the pointers 12 are directed toward the graduations 11 corresponding with such angle of ascent or descent. Thus the aviator is always advised as to whether the machine is listing to one side or the other and also as to whether the machine is ascending or descending. He is also able to tell the exact number of degrees of the angle of inclination of the machine either in a fore and aft direction or in a lateral direction. The indicator 12 of the upper opening 19 is intended for use during ordinary flying while the lower indicator 12 is used when performing such an evolution as looping the loop and other evolutions which require an extraordinary angle of ascent or descent.

I claim:—

In an inclinometer for aircraft, the combination of a casing, a dial in said casing and graduated to indicate the degree of inclination of the craft, an indicator coöperating with said dial, a shaft carrying said indicator, an arm having its center secured to said shaft, and a pendant weight swiveled on each end of said arm and adapted to sweep through an arc of three hundred and sixty degrees about an axis extending longitudinally of said arm.

In testimony whereof I affix my signature.

GEORGE W. BERRY.